United States Patent [19]

Tilbrook et al.

[11] 4,412,969

[45] Nov. 1, 1983

[54] COMBINATION PIPE RUPTURE MITIGATOR AND IN-VESSEL CORE CATCHER

[75] Inventors: Roger W. Tilbrook, Monroeville, Pa.; Franz J. Markowski, Richland, Wash.

[73] Assignee: The United States of America as represented by the U.S. Department of Energy, Washington, D.C.

[21] Appl. No.: 356,569

[22] Filed: Mar. 9, 1982

[51] Int. Cl.³ .............................................. G21C 15/00
[52] U.S. Cl. .................................. 376/280; 376/399; 376/352; 376/281
[58] Field of Search ................ 376/280, 352, 281, 400, 376/390, 377, 389, 399

[56] References Cited

U.S. PATENT DOCUMENTS

| | | |
|---|---|---|
| 2,990,349 | 6/1961 | Roman .............................. 376/280 |
| 3,203,867 | 8/1965 | Williams et al. ................. 376/400 |
| 3,215,606 | 11/1965 | Silvester . | |
| 3,275,521 | 9/1966 | Schluderberg et al. ............ 376/399 |
| 3,700,552 | 10/1972 | Schluderberg . | |
| 3,964,966 | 6/1976 | Lampe . | |
| 4,043,868 | 8/1977 | Irion et al. . | |
| 4,071,403 | 1/1978 | Andrews et al. . | |
| 4,080,252 | 3/1978 | Redding . | |
| 4,116,764 | 9/1978 | Jones . | |

Primary Examiner—Harvey E. Behrend
Attorney, Agent, or Firm—Sandra Weiss; James W. Weinberger; Richard G. Besha

[57] ABSTRACT

A device which mitigates against the effects of a failed coolant loop in a nuclear reactor by restricting the outflow of coolant from the reactor through the failed loop and by retaining any particulated debris from a molten core which may result from coolant loss or other cause. The device reduces the reverse pressure drop through the failed loop by limiting the access of coolant in the reactor to the inlet of the failed loop. The device also spreads any particulated core debris over a large area to promote cooling.

11 Claims, 3 Drawing Figures

COMBINATION PIPE RUPTURE MITIGATOR AND IN-VESSEL CORE CATCHER

CONTRACTUAL ORIGIN OF THE INVENTION

The U.S. Government has rights in this invention pursuant to Contract No. E(11-1)-2395 between the U.S. Department of Energy and Westinghouse Electric Corporation.

BACKGROUND OF THE INVENTION

This invention relates to a means for mitigating the effects of a coolant loop pipe rupture in a nuclear reactor. More specifically, this invention relates to a means of preventing rapid loss of liquid coolant from the core of a nuclear reactor in the event of a ruptured pipe in a coolant loop. The invention also relates to a means for retaining molten core material in the vessel of a nuclear reactor.

In a typical nuclear reactor design, fissile fuel is contained in a reactor core which is housed in a reactor vessel. During nuclear fission, the fuel in the core produces large quantities of heat which can be used to generate electricity in a power plant. A flowing coolant is used to transfer the heat from the reactor core to the electric power plant. In nuclear reactors cooled by a flowing liquid in which the liquid is circulated by several coolant loops, a rupture or failure of one of the loops may result in the loss of coolant from the reactor core. The core may then overheat and melt, causing extensive damage to both the core and vessel. Thus, a device to mitigate the effects of a coolant loop rupture would maintain coolant flow in the core region for as long a time as possible. This would be accomplished by increasing the pressure drop from the core region to the ruptured coolant loop. An appropriate form of such a device could also retain any molten core debris and spread it over a large area to promote rapid cooling.

Various devices have been suggested to minimize the reversed flow of coolant through the inlet pipe of a failed coolant loop. Such devices are passive and operate on the basics of fluidics, such as the vortex diode. These devices reduce the reversed flow of coolant but they do not provide a structure for retention of molten core debris or for spreading the debris over a large area. In current reactor designs, the debris retention capability of the lower head of the reactor is limited by the curvature of the vessel. In addition, the debris bed may be too thick to cool without remelting.

SUMMARY OF THE INVENTION

It is one object of the subject invention to provide for a nuclear reactor having a plurality of coolant loops a means for impeding rapid loss of coolant from the reactor vessel in the event of a coolant loop rupture.

It is another object of the invention to provide for a nuclear reactor a means for catching debris from the reactor core in the event of a meltdown of the reactor core.

Additional objects, advantages, and novel features of the invention will be set forth in the following description.

In accordance with the invention the apparatus comprises a horizontal plate positioned within the reactor vessel below the core support structure of the reactor such that the plate, the interior walls of the vessel, and the lower vessel head form a chamber. The chamber is divided into sections by vertical imperforate partitions extending between the plate and the lower vessel head. Each coolant loop of the reactor has an inlet pipe which enters the reactor vessel and which is positioned such that it discharges coolant into a separate section of the chamber. Thus, each section of the chamber is associated with one coolant loop of the reactor. The horizontal plate has numerous nozzles through which coolant flows freely upward from the chamber sections to the core region but which restrict flow downward from the core region to the chamber.

During normal operation, coolant flows through each coolant loop inlet pipe into a section of the chamber and then upward through the nozzles of the plate to the reactor inlet plenum region. Under certain emergency conditions, one of the coolant loops may rupture. In the absence of the present invention, coolant would rapidly flow from the inlet plenum out of the reactor through the inlet pipe of the ruptured loop thus bypassing the core. This loss of coolant could lead to fuel damage and possibly a meltdown of the reactor core. The present invention inhibits the flow of the coolant from the reactor in several ways. Coolant already present in the core and inlet plenum of the reactor vessel is restrained from leaving the vessel through the ruptured loop by the resistance of the nozzles in the plate to downward coolant flow from the core region to the chamber. Also, only a small part of the plate gives access to the chamber section associated with the ruptured coolant loop. Coolant entering the reactor vessel from the intact coolant loops is likewise inhibited from leaving the reactor through the ruptured loop by these means and also by the fact that incoming coolant must be discharged into its own chamber section, forced upward through the plate nozzles from the chamber to the inlet plenum, migrate to the area above the section associated with the ruptured loop and then flow downward through other plate nozzles and out of the vessel through the inlet pipe of the ruptured loop. Thus the device substantially inhibits the flow of coolant from the reactor vessel. In addition, in the event that loss of coolant or other cause may lead to meltdown of the reactor core the horizontal plate provides a means whereby any molten, and subsequently particulated, or damaged core material can be caught and spread over a large area to promote cooling.

In another embodiment, a second horizontal plate may be positioned between the aforementioned plate and the lower vessel head. In this case the lower horizontal plate is perforated with nozzles similar to those in the upper horizontal plate. The vertical imperforate partitions extend between the plates and do not come in contact with the lower vessel head. In this embodiment any molten core material that falls through the nozzles of the upper plate will be caught and spread on the lower plate rather than coming in contact with the lower vessel head.

BRIEF DESCRIPTION OF THE DRAWINGS

FIG. 3 is a more detailed illustration of possible designs for the bleed holes and nozzles for the horizontal plates.

DETAILED DESCRIPTION OF THE PREFERRED EMBODIMENT

Figure 1:
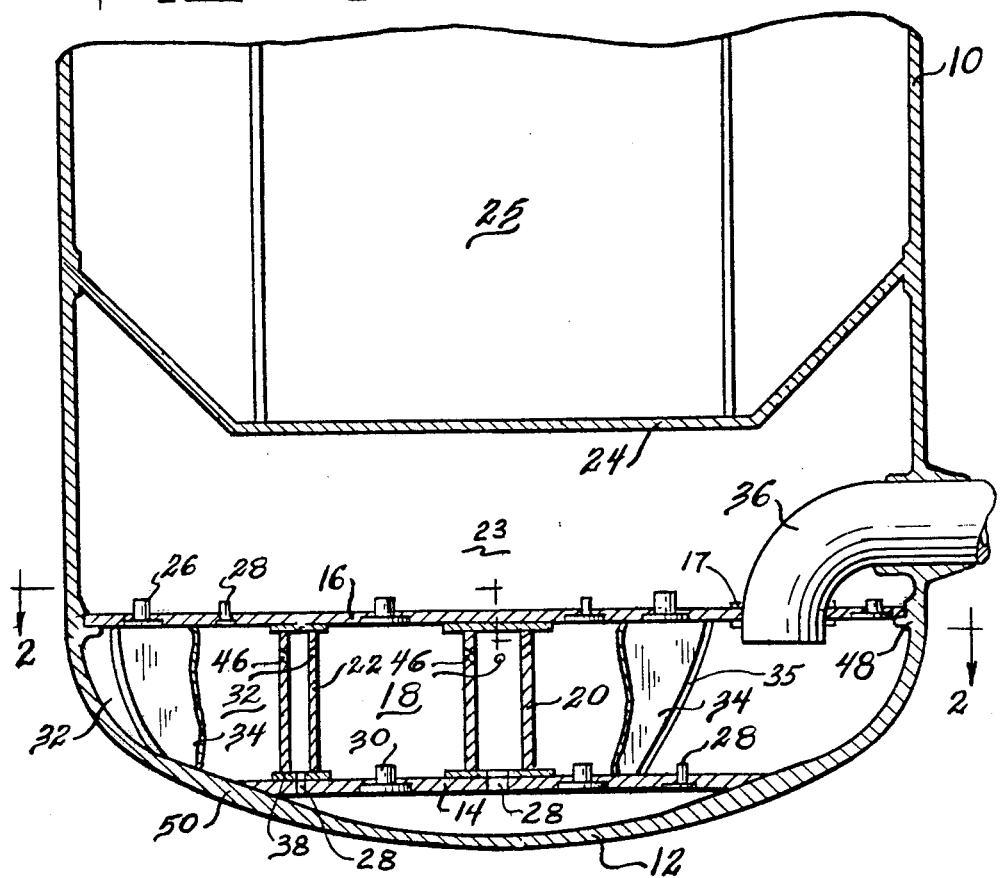
FIG. 1 is a cross-sectional view of the lower portion of a nuclear reactor vessel showing the upper and lower horizontal plates and support columns of the invention situated beneath the core support structure.

FIG. 1 shows the lower portion of a reactor vessel 10. Above the lower vessel head 12 are two horizontal plates, a lower plate 14 and an upper plate 16. The two plates and the interior walls of the vessel 10 form a chamber 18. Supporting the upper plate 16 are a central column 20 and several support columns 22, only one of which is shown in this Figure. The upper plate 16 is located below the core support structure 24 enclosing the inlet plenum 23. Above the core support structure is the core 25, not shown in detail. The upper plate 16 has large nozzles 26 and smaller bleed holes 28. The lower plate 14 is perforated with similar bleed holes 28 and pressure equalization nozzles 30. The nozzles 26, and bleed holes 28 are all designed and installed in the plates to have greater resistance to downward fluid flow from the inlet plenum 23 to the chamber 18 than upward fluid flow from the chamber 18 to the inlet plenum 23. The pressure equalization nozzles 30 in the lower plate 14 are designed and installed in a like manner to the nozzles 26 in the upper plate 16.

Figure 2:
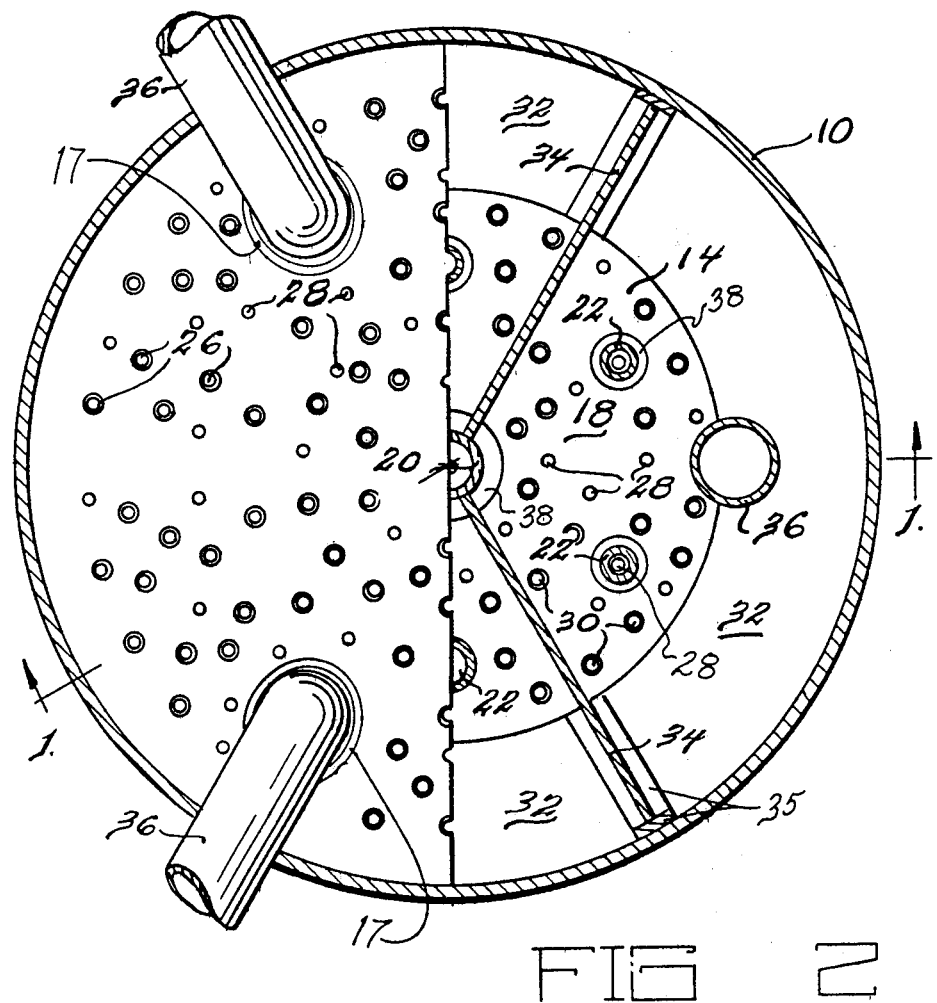
FIG. 2 is a cut-away view of the invention looking down at the horizontal upper plate showing the coolant inlet pipes, upper plate nozzles, bleed holes, and vertical imperforate partitions dividing the chamber between the plates into sections.

As seen in FIG. 2, the chamber 18 between the upper and lower horizontal plates 16 and 14 is divided into sections 32 by vertical imperforate partitions 34 extending radially from the central column 20. Between the partitions 34 and the vessel walls are flow restriction devices 35 which are designed to minimize coolant flow between adjacent sections 32. Coolant loop inlet pipes 36, only one of which is shown enter the reactor vessel 10 above the upper plate 16 and extend therethrough via a collar 17 to the chamber 18. The collar 17 permits limited relative movement of the inlet pipe 36 and upper plate 16 and may include a flow restriction feature. Each coolant loop inlet pipe 36 terminates in a section 32 of the chamber 18. Coolant from the coolant loops enters the reactor vessel 10 through the inlet pipes 36, empties into a section 32 of the chamber 18 and flows upward through the upper plate nozzles 26 of the upper plate 16, through the inlet plenum 23, past the core support structure 24, upward to the core 25 and out through coolant outlet pipes, not shown.

In the event of a coolant loop rupture such that the coolant inlet pipe 36 of the ruptured loop were not discharging coolant into its chamber section 32, coolant already in the reactor vessel 10 would, in the absence of the instant invention, flow downward from the core 25 through the inlet plenum 23 and out of the reactor vessel 10 through the inlet pipe 36 of the ruptured coolant loop. This could result in loss of coolant from the reactor core 25 and subsequent core damage possibly including some melting.

The instant invention serves to inhibit the outflow of coolant already in the reactor inlet plenum 23 and core 25, and to retain coolant flowing into the reactor vessel from the intact loops. The upper plate 16 restricts the flow of coolant from the inlet plenum 23 to the inlet pipe 36 of the ruptured loop therebelow, because the nozzles 26 through which the coolant flows occupy only a small fraction of the total surface area of the plate. The design of the upper plate nozzles 26, which are the primary means of access to the ruptured coolant loop, further restricts the flow of coolant exiting the reactor. Furthermore, incoming coolant is rerouted so that it cannot flow directly through the chamber from an intact loop to a ruptured loop. Coolant flowing from an intact coolant loop to a section 32 of the chamber 18 must first flow upward through the upper plate nozzles 26 to the inlet plenum 23 and then down through other flow resistive upper plate nozzles 26 to the chamber section associated with the ruptured loop. This circuitous route impedes the flow of coolant from an intact loop through the ruptured loop, and provides an increased reverse flow pressure drop.

If an event occurs which causes the core to overheat and melt, the molten core debris would particulate in the coolant under the core support structure 24, fall to the bottom of the reactor vessel, and may cause further damage to the vessel boundary if the resulting debris bed is too deep. The upper plate 16 of the invention mitigates against these occurrences by providing a surface to catch any debris from the core. Molten debris could spread over the large plate area for efficient cooling. Any debris which fell through the nozzles 26 of the upper plate 16 would be caught by the lower plate 14 and cooled in the same way.

In a meltdown situation, it may be assumed that the molten core material and other debris may form a bed four inches deep with 50 percent porosity and 50 percent of the particulate debris as steel. This corresponds to an equivalent fuel debris depth of 1 inch. For a vessel with a diameter of 20 ft and an upper plate with 10 percent nozzle area, this corresponds to about 23 ft$^3$ of fuel oxide retained on the upper horizontal plate. For larger scale plants with diameters of 28 ft and 32 ft, the latter perhaps using in-vessel downcomers, this corresponds to about 46 ft$^3$ to 67 ft$^3$ of fuel oxide retained respectively. Considering the ranges of plant power and core size appropriate to these vessel diameters, the debris retention capabilities are in the range of 60% to 87%. These retention capabilities do not include the additional capability of the lower catch plate. The invention is a significant improvement over current reactor design wherein the lower vessel head of the reactor has a retention capability of the order of less than 4 percent of the core volume.

The apparatus may be constructed according to techniques known in the art. The central column 20 is provided for support and to simplify assembly. The vertical partitions 34 may be welded to the central column 20 with simple butt welds. The central column 20 and support columns 22 are provided with footer plates 38 to spread the column loads on the horizontal plates 14 and 16. The columns are not solid so that material thickness and attendant thermal stresses are reduced. The flow restriction device 35 at the outer edges of the vertical partitions 34 may be embodied in various ways. Ideally, there should be no fluid flow between the sections 32 of the chamber 18 except by means of the nozzles 26. This result may be achieved if the flow restriction device 35 is a weldment, for example, but with some reactor designs this may cause undue stress on the vessel walls. Alternatively, the device 35 may be a load-bearing structure to minimize both stress and fluid flow, such as a labyrinthine seal with a contact pad.

The upper horizontal plate 16 is provided with a plurality of nozzles 26 through which coolant flows upward from the chamber 18 to the inlet plenum 23 and thence to the core 25. While many designs for these nozzles are possible, a preferred design is illustrated in FIG. 3. In this design, the upper plate 16 is fitted with a nozzle insert 40 which is shaped so that it cannot enter the core support structure 24 even if the welds between the insert 40 and the plate 16 fail. Detailed machining may be done on the insert 40 rather than on the plate 16 to reduce costs. Because in this design the insert 40 may extend beyond the thickness of the plate 16, the thickness of the upper plate 16 can be minimized according to mechanical and structural considerations and to reduce thermal stress.

The nozzle 26 is wider toward the chamber 18 and is narrower toward the plenum 23 so that coolant flows easily from the chamber 18 to the plenum 23, while the nozzle 26 provides higher resistance to coolant flow in the reverse direction. A typical nozzle is about 5 inches long, has an upper narrower diameter 41 of about 1½ inches and a lower wider diameter 42 of about 2 inches, with the lower edges 43 curved along a 1 inch radius. A nozzle of these dimensions will give a backward to forward pressure drop ratio of about 2.4. The nozzles 26 extend above the surface of the upper plate 16 so that in the event of a core meltdown, molten core debris, which is now particulate form, on the surface of the upper plate 16 must accumulate to a considerable depth before it will flow downward through the nozzles 26 to the chamber 18 and lower plate 14.

The nozzles 26 may be positioned in the upper plate 16 in a variety of configurations. The choice of configuration depends on several design criteria for the reactor. The coolant flow distribution between the chamber 18 and the inlet plenum 23 above the upper plate 16 must be considered as this affects the pressure differentials across the horizontal plates 14 and 16 and the vertical partitions 34. For example, if the upper plate 16 is not welded to the reactor vessel 10, as may occur with some design options, the upper plate 16 may have a tendency to overturn during a coolant loop rupture due to unbalanced upward forces on the plate 16 from the coolant flow from the intact loops. Proper positioning of the nozzles 26 can lessen the tendency of the upper plate 16 to overturn. Furthermore, the nozzles should be placed so that in the event of a core meltdown a maximum amount of debris will be retained on the upper plate 16 and a minimum amount will pass through the nozzles 26 to the lower plate 14. Finally, the distance between the nozzles 26 should be be sufficient to ensure the structural strength of the upper plate 16.

The nozzle configuration shown in FIG. 2 is typical. For nozzles about 4½ inches apart, about 10% of the area of the upper plate 16 is open to coolant flow to give a normal operating pressure drop of about 0.25 psi. In the event of a coolant loop rupture, the reverse pressure drop would be about 2.4 psi, including the effective doubling of the flow rate from the two intact loops to the failed loop. For this design, the upward force on the upper plate 16 is less than 12,000 lb-force, compared to an upper plate weight of about 24,600 lb-force for a 2½ inch thick plate.

The lower plate 14 is fitted with pressure equalization nozzles 30 which are necessary primarily while the reactor vessel 10 is being filled with coolant. The number of pressure equalization nozzles 30 in each section 32 of the lower plate 14 should be minimized to reduce the amount of molten core debris which would pass through from the chamber 18 to the lower vessel head 12 in the event of a core meltdown. The placement of nozzles 30 in the lower plate 14 will also depend on the configuration of the nozzles 26 of the upper plate 16 for the same reason. The pressure equalization nozzles 30 may or may not be of the same design as the nozzles 26 of the upper plate 16. They may extend above the upper surface of the lower plate 14 to hinder the flow of particulated core debris through the lower plate 14 to the lower vessel head 12.

Both the lower plate 14 and the upper plate 16 are provided with bleed holes 28 to prevent gas accumulation below the plates. A typical design for a bleed hole is illustrated in FIG. 3. An insert 44 is machined separately and welded to the plate 14 or 16 similar to the insert 40 used with the upper plate nozzles 26. The lower surface of the plate in the area 45 around the bleed hole 28 may be chamfered toward the bleed hole for more efficient release of gases. Some of the bleed holes 28 in the lower plate 14 may empty into the central column 20 and support columns 22 and out through column vents 46. This arrangement reduces the area of openings in the lower plate 14 through which particulated core debris could flow to the lower vessel head 12 and also permits an easier filling process. These bleed-holes may be simple drilled holes without a raised insert 44.

The two horizontal plates 14 and 16 may be supported in the reactor vessel 10 by any of several means. The plates 14 and 16 may be secured to the walls of the vessel 10 by any well-known means such as welding or bolting although this may require thicker walls to minimize stress as shown at locations 48 and 50 of the vessel wall 10 in FIG. 1. Alternatively, the plate may simply rest against the walls of the vessel. In that case, means must be employed to resist both an overturning motion in the event of a coolant loop rupture, and rotation about the central column 20 due to vibrations which would cause stress on the coolant inlet pipes 36. For example, the upper plate 16 may be fitted with a flange about its circumference, or the lower plate may rest on a support ledge built in the vessel wall, and the partition flow limiting device 35 may include and an anti-rotation feature such as a lip. If these options are not used, a side plate concentric with the vessel wall 10 may be used to prevent excess debris from sliding between the vessel wall 10 and lower plate 14 to the lower vessel head 12.

Clearly many modifications are possible in view of the above teachings. For example, if a reactor is designed so that the coolant inlet pipes 36 enter the reactor above the core region 25, pipe extensions may be added so that coolant will discharge below the horizontal plate 16. In another embodiment, the lower plate 14 may be eliminated entirely so that the chamber 18 is formed by the horizontal plate 16 and the lower vessel head 12. In this embodiment the vertical imperforate partitions 34 would extend from the horizontal plate 16 to the vessel head 12, and terminate in a flow limiting device 35. Such device 35 could prohibit azimuthal rotation as noted above. Thus, the foregoing description of a preferred embodiment is not intended to limit the invention to the precise form disclosed. The embodiment was chosen and described in order to best explain the principles of the invention and its practical application.

We claim:

1. In a liquid-cooled nuclear reactor having a plurality of coolant loops for supplying coolant to a reactor core supported on a core support structure and which is positioned within a reactor vessel, a device for mitigating the effects of a failed coolant loop and for catching particulated material from the core, comprising:

a first plate capable of retaining particulated core material, the first plate being positioned beneath said core support structure and spanning the cross-section of said reactor vessel such that the first plate and the bottom wall of said reactor vessel form a chamber, means comprising imperforate partitions extending downwardly from the first plate for dividing the chamber into a plurality of separate sections such that there is one section of the chamber for each coolant loop, at least one inlet pipe from each coolant loop, each inlet pipe entering said reactor vessel and positioned such that it discharges into a separate one of said sections of the chamber, and a plurality of nozzles extending through the first plate, the nozzles being designed such that the pressure drop from the core region to the chamber is greater than the pressure drop from the chamber to the core region, thus reducing the volume of fluid flowing out of the reactor vessel through a failed coolant loop.

2. The device of claim 1 in which a second plate is positioned between the first plate and the bottom of said reactor vessel such that the second plate spans the cross-section of said reactor vessel and forms a chamber with the first plate, the imperforate partitions extending between the first plate and the second plate to divide the chamber into sections, each coolant loop inlet pipe discharging into a separate section of the chamber.

3. The device of claim 2 in which the second plate is perforated by a plurality of nozzles, the nozzles being designed such that the pressure drop from the chamber to the bottom of the reactor is greater than the pressure drop from the bottom of the reactor to the chamber.

4. The device of claim 2 in which the nozzles of the first plate extend sufficiently beyond the upper surface of the first plate to restrain particulated core debris on said surface from flowing downwardly through said nozzles.

5. The device of claim 3 in which the nozzles of the second plate extend sufficiently beyond the upper surface of the second plate to restrain particulated core debris on said surface from flowing downwardly through said nozzles.

6. The device of claim 1 wherein the first plate is perforated by a plurality of bleed holes to allow the flow of gases therethrough the diameter of the bleed holes being smaller than the smallest diameter of the nozzles.

7. The device of claim 2 wherein the second plate is perforated by a plurality of bleed holes to allow the flow of gases therethrough, the diameter of the bleed holes being smaller than the smallest diameter of the nozzles.

8. The device of claim 1 including means to prevent the first plate from overturning due to uneven forces applied thereto in the event of a coolant loop rupture.

9. The device of claim 1 wherein the sum of the areas of the upper openings of the first plate nozzles is ten percent of the total upper surface area of the first plate.

10. The device of claim 1 wherein the backward to forward pressure drop ratio of the nozzles of the first plate is at least 2.4.

11. The device of claim 3 wherein the backward to forward pressure drop ratio of the nozzles of the second plate is at least 2.4.

* * * * *